J. L. DAVIS.
CHECK OR ACCOUNT BOOK.
APPLICATION FILED JUNE 1, 1921.

1,417,977.

Patented May 30, 1922.

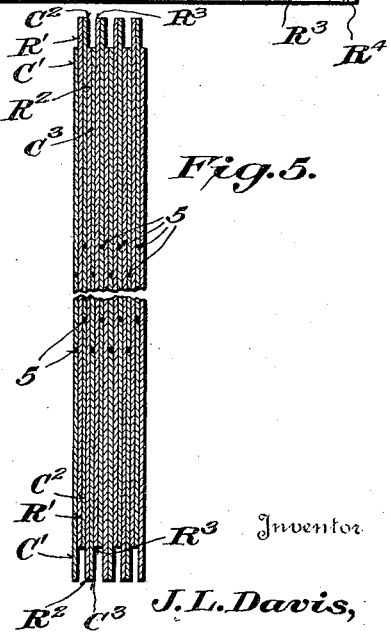

UNITED STATES PATENT OFFICE.

JAMES L. DAVIS, OF RICHMOND, VIRGINIA.

CHECK OR ACCOUNT BOOK.

1,417,977.  Specification of Letters Patent.  Patented May 30, 1922.

Application filed June 1, 1921. Serial No. 474,148.

*To all whom it may concern:*

Be it known that I, JAMES L. DAVIS, a citizen of the United States, residing at Richmond, in the county of Henrico and State of Virginia, have invented new and useful Improvements in Check or Account Books, of which the following is a specification.

My invention relates to sheets or forms, usually in bound book-form, especially suitable for check or draft books, but which may be adapted for other kinds of accounts or records where conditions are suitable.

The general purpose of the invention is to provide a check or like book in which a complete record of transactions may be kept with great facility. A more particular object is to avoid certain difficulties and annoyances experienced in check books of ordinary form, in carrying forward "total" or other figures from one sheet to the next.

Another object is to provide for conveniently recording the balance at any moment or "individual check" balance.

Other objects are to provide for conveniently comparing, at every stage of proceedings, the individual balance with the total of deposits and total of checks drawn; for "checking" the permanent record when comparing it with canceled checks; to eliminate check stubs as ordinarily provided; and to enable a complete record of cash transactions to be kept in the check book in certain cases, when that is desired, so that the cash book ordinarily used in an accounting system can be eliminated. In connection with the general purpose of the invention as first above set forth, an object is to provide for a complete duplicate record, or "carbon copy" of each check; and while it is not broadly new with me to provide sheets on which such complete records of original data are made by the use of "carbon" paper, this feature is incorporated in a novel way in connection with other features of my invention.

The foregoing and other objects are accomplished in the representative embodiment of my invention shown in the accompanying drawings. After considering this embodiment, as described in detail hereafter, it will be understood that many variations may be made within the principles of the invention, and I contemplate the employment of any forms of the invention which are within the scope of the appended claims.

In the drawings:

Fig. 1 is a face or "plan" view of a check book which is one representative embodiment of my invention, with the cover thrown back and broken away.

Fig. 2 shows one of the record sheets, the first, as the book is arranged in this embodiment.

Fig. 3 is a face or plan view of the book, with four successive sheets pushed back so that each one permits certain features of the next to be observed, and with the fifth sheet partly torn away, to reveal features of the sixth.

Fig. 4 is a detail of a modified form of the book.

Fig. 5 is a section on the line 5—5, Fig. 1.

The binding of the different sheets in book form is sufficiently represented in Fig. 1, which shows the usual cover 1 thrown back on the usual fold line. The particular form of binding is, of course, unimportant.

Check sheets $C'$, $C^2$, $C^3$, etc., alternate with record sheets $R'$, $R^2$, $R^3$, etc., throughout the book. The record sheets may have a distinctive color, when desired. Each sheet has a convenient or usual number of checks 2, in this case three, in accordance with one ordinary practice, and these are connected along the perforated line 3 with an inner marginal portion 4 of considerable width, which is usually left blank, and the checks are divisible from each other by lines of perforations 5, as usual.

The checks have spaces for the usual entries, as sufficiently indicated by the various lines and legends, including a space 6 for the amount in figures, and this is desirably (although not necessarily) placed toward the right hand end of the check, as shown.

Each record sheet has spaces, sufficiently indicated by rulings and characters, corresponding with the check spaces, so that as each check is written its complete data is transferred to the under-lying record sheet by means of a sheet of carbon paper placed between the two sheets, showing of this carbon sheet being omitted to avoid confusion in the drawings.

The check spaces 6 for the amount in figures, are arranged over a column 7 on the record sheet headed on alternate record sheets "Amount of check", so that when the check is written its amount will always appear in the record column for convenient observation and addition. Since the record sheets take the place of the ordinary "stubs", it is impossible for an amount to be entered on a stub, different from the amount of the corresponding check; and in this way a source of frequent confusion in ordinary check books is avoided. The marginal portions 4 may be used for any desired notations or may be left blank. There is no necessity for writing on the backs of these portions, which are in the location of the ordinary stubs, since all necessary records are kept on the right-hand upward faces of the sheets, as will appear, and the difficulties involved in keeping records of checks received, or deposits, on the back of the stubs, which increase as the relatively short, stiff and unwieldy mass of stubs increases, are avoided.

At a convenient place, in this case adjacent to the "amount" column and along the outer margin of the sheet, each record sheet has a column 8 headed "Balance" on alternate sheets. Between these columns, or elsewhere, if desired, is a "check" column 9. The checks may have blank outer margins 10 as usual, and these may overlap the record columns 8.

Each record sheet also desirably has other columns, including in the present case a "date" column 11, "description" column 12 and an "amount" column 13, for the entry of the dates, descriptions and amounts of moneys or checks received, or of deposits, as may be desired. These columns are desirably placed at the left of the main, central record space of the record sheet, although they may be placed elsewhere in some cases. These columns are headed, on alternate record sheets, with appropriate words indicating their use. Desirably a "ledger page" column 14 is also inserted alongside the amount column, in some cases, for entry of the ledger page in posting.

The columns at the left on the record sheets provide for the entry of the date, name of remitter, or other description, and amount of moneys or checks received, or deposited, as the case may be, and these amounts may be posted directly from the record sheet to ledger accounts, the ledger page being entered in the column 14, as usual in posting. The columns at the right on the record sheets provide for entry of the amount of each individual check, this being accomplished in the act of writing the check itself, as previously explained, and column 8 provides for entering opposite each check record the amount of the momentary or individual check balance. As so far described, the record sheets may be added and the total entered at the foot of each column, except the balance column, and may be carried forward from each record sheet to the next one in the ordinary way, and in this case the record and check sheets would usually all be made of substantially the same vertical length. As so embodied and used the invention has the advantages of providing a complete duplicate record, with the amount of the check entered on the record sheet "automatically" without possibility of difference from the check amount; receipts or deposits and checks appear on a single record sheet; space is provided for entering the individual check balance and this is in such a position that it can be easily compared with the totals in the "amount" column 13 and the "amount of check" column 7, and a proof of correctness of the balance thus obtained practically instantly.

The "checking" column 9 which may be headed with the typical "check mark" is provided for the purpose of inserting a "check mark" opposite each check space as canceled checks returned from the bank are compared with the records, this being an aid to determine what checks are still outstanding and thereupon computing the proper difference between the balance shown by the depositor's book and the balance reported by the bank.

An important object and advantage of my invention, however, is to save time and trouble and avoid errors in carrying forward totals from one record sheet to the next; and for this purpose alternate record sheets are arranged in vertically offset relation, so that, for example, the lower margin of the second record sheet $R^2$ appears below the lower edge of the first record sheet $R'$. The second record sheet $R^2$ is ruled a short distance above its lower edge with a "total" line 17 extending usually entirely across the sheet and this is substantially coincident with or slightly below the lower edge of the preceding record sheet. The upper marginal portion of the first record sheet $R'$ extends substantially the same distance above the upper edge of the second sheet $R^2$, and the third record sheet $R^3$ extends above the second. That is to say, alternate record sheets $R'$, $R^3$, etc., are similar and similarly arranged in the book, with their upper edges substantially flush with the upper edge of the book and their lower edges spaced upward from the lower edge of the book, while the other alternate record sheets $R^2$, $R^4$, are usually different from the first set, but similar to each other, and similarly placed in the book, with their upper edges depressed below the upper edge of the book and their lower edges substantially flush with the lower edge of the book. The legends, such as date, description, etc., most desirably appear on the upwardly extending margins of the record sheets $R'$, $R^3$, etc., and it is usually unnecessary to place any explanatory legends in the columns of the record sheets $R^2$, $R^4$, etc., although this may be done in certain cases.

The check sheets need not in all cases conform to the arrangement of the record sheets, but in some cases, as exemplified in the present embodiment, the check sheets are in a "staggered" arrangement, in alternately elevated and depressed positions, similar to the positions of the record sheets, that is to say, the first check sheet C' has its upper edge so located that the upper headed margin of record sheet R' is visible and its lower edge flush with the bottom of the book; and from that point on each check sheet is substantially co-extensive with and underlies the preceding record sheet, so that check sheet C² underlies and is positioned in accordance with the positioning of record sheet R'; and so on throughout the book, except of course, that a check sheet is not provided beneath the last record sheet.

The first sheet of checks is written in the usual way with an underlying carbon sheet in contact with the record sheet. All the check data thereupon appears on the central blanks of the record sheet and the check amount in figures appears in the "amount of check" column 7. The checks are torn off and the marginal portion 4 turned back and any receipts or deposits are entered in the columns at the left, any amount on hand or brought forward from the last check book being, of course, entered at the head of the amount column 13, and a corresponding entry being made at the head of the balance column 8. The individual balance after deducting each check is entered in the balance column, this, of course, taking into consideration any deposits or receipts appearing at the left. At any time the figures in the balance column can be compared with the totals of columns 13 and 7. Instead of placing the totals of the entire record sheet at the bottom of that sheet they are simply entered as the additions are made on the lower projecting margin of the next record sheet R², and the annoyance and liability to error involved in turning over from one sheet to the next to transfer totals is avoided. The checks on the second check sheets 2 are desirably written upward (although this is not necessary in all cases) and when this is done the second record sheet is figured upward from the bottom in a way which will be obvious from the previous description, and the totals of this sheet are entered on the adjacent projecting upper margin of the third record sheet R³; and so on throughout the book.

Fig. 3 shows several successive sheets commencing with the first sheet C', pushed back, so that each sheet reveals the right hand portion of the next, and one of the sheets C³ is torn away at the corners to reveal underlying portions of the next record sheet R³ and a lower marginal portion of the following record sheet R⁴ is also visible. This figure brings out clearly the relative vertical arrangement of the sheets and the manner in which the upper and lower record sheet margins protrude to receive the amounts of addition as previously explained.

Fig. 4 shows one modification in which a record sheet R¹⁰ is made wider than in the previous embodiment for the accommodation of additional credit columns 20 and 21, which may have any suitable headings. There may be any desirable number of these different columns on the general plan of a multiple credit column cash book, and the amount of each check is entered in the suitable column or columns for a proper distribution of the charge, as is customary in cash book entries. The check book when so arranged will serve all purposes of a cash book in addition to its ordinary functions, and the cash book may then be dispensed with. Many other changes in ruling to suit different conditions may obviously be made within the principles of the invention, and changes in physical form and arrangement of the sheets may also be made, and I do not limit myself to details except as claimed.

What I claim is:—

1. An accounting book of the check book type, comprising alternate check and record sheets, the record sheets being suitably ruled to provide a duplicate of the check data by carbon impression, the record sheets being arranged so that upper margins of certain record sheets are exposed above the upper edge of a preceding sheet, and lower margins of certain sheets are exposed below the lower edge of a preceding sheet.

2. An accounting book of the check book type, comprising alternate check and record sheets, the record sheets being suitably ruled to provide a duplicate of the check data by carbon impression, the record sheets being arranged so that upper margins of certain record sheets are exposed above the upper edge of a preceding sheet, and lower margins of certain sheets are exposed below the lower edge of a preceding sheet, upper and lower margins of the check sheets being alternately elevated and depressed so that each check sheet is positioned in substantial accordance with an adjoining record sheet.

3. An accounting book of the check book type consisting of alternating check and record sheets, a first record sheet, commencing at any intermediate portion of the book, being relatively elevated so that the lower margin of the second record sheet appears below its lower edge, said second sheet being relatively depressed so that the margin of the third record sheet appears above its upper edge, and so on throughout the book, the record sheets having spaces to receive check data by carbon impression including a check amount column in which the check amount in figures appears as the check is written.

4. An accounting book of the check book type consisting of alternating check and record sheets, a first record sheet, commencing at any intermediate portion of the book, being relatively elevated so that the lower margin of the second record sheets appears below its lower edge, said second sheet being relatively depressed so that the margin of the third record sheet appears above its upper edge, and so on throughout the book, the record sheets having spaces to receive check data by carbon impression including a check amount column in which the check amount in figures appears as the check is written, certain exposed marginal portions of the record sheets having descriptive column legends.

5. An account book of the check book type, comprising check sheets, each including a plurality of vertically arranged checks connected to a marginal portion inserted in the binding, a record sheet between each two check sheets, the record sheets having check data spaces corresponding substantially to the check ruling and including a vertical amount column space, the record sheets also having additional column rulings including a "check" column for the insertion of check marks in comparing cancelled checks with the record sheets.

Signed this 25 day of May, 1921, in the presence of witnesses.

JAMES L. DAVIS.

Witnesses:
 GEO. F. SHAVER,
 N. KELLY.